(12) United States Patent
Schillings et al.

(10) Patent No.: US 9,052,896 B2
(45) Date of Patent: Jun. 9, 2015

(54) ADJUSTING MOBILE DEVICE STATE BASED ON USER INTENTIONS AND/OR IDENTITY

(75) Inventors: Benoit M. Schillings, Los Altos, CA (US); David Harry Garcia, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 447 days.

(21) Appl. No.: 13/554,838

(22) Filed: Jul. 20, 2012

(65) Prior Publication Data

US 2014/0025973 A1 Jan. 23, 2014

(51) Int. Cl.
  *G06F 1/00* (2006.01)
  *G06F 1/32* (2006.01)
  *H04Q 9/00* (2006.01)
  *G06N 3/08* (2006.01)
(52) U.S. Cl.
  CPC ................ *G06F 1/3203* (2013.01); *H04Q 9/00* (2013.01); *G06N 3/08* (2013.01); *H04Q 2209/10* (2013.01); *H04Q 2209/47* (2013.01); *H04Q 2209/43* (2013.01); *H04Q 2209/50* (2013.01); *H04Q 2209/823* (2013.01)
(58) Field of Classification Search
  CPC .................................................... G06F 1/3203
  USPC ........................................................ 713/300
  See application file for complete search history.

(56) References Cited

U.S. PATENT DOCUMENTS

| | | |
|---|---|---|
| 2003/0198196 A1 | 10/2003 | Bahl |
| 2007/0002016 A1 | 1/2007 | Cho |
| 2010/0141399 A1 | 6/2010 | Swope |
| 2011/0081634 A1 | 4/2011 | Kurata |
| 2011/0314419 A1* | 12/2011 | Dunn et al. .................... 715/810 |
| 2012/0306722 A1* | 12/2012 | Kim et al. ...................... 345/1.2 |
| 2013/0290761 A1* | 10/2013 | Moon et al. ................... 713/323 |

FOREIGN PATENT DOCUMENTS

KR 10-0678713 B1 2/2007

OTHER PUBLICATIONS

PCT International Search Report and Written Opinion for PCT/US2013/050446; WIP, Oct. 10, 2013.

* cited by examiner

*Primary Examiner* — Mohammed Rehman
(74) *Attorney, Agent, or Firm* — Baker Botts L.L.P.

(57) ABSTRACT

In one embodiment, when a computing system is in a first state, a first set of inputs from one or more first sensors is detected. A first sensor value array is generated, and the first value array is fed as input to a first function generated by a first neural network. One or more first output values are calculated based on the first function, and a determination is made based on these first output values if a first action has occurred. If a first action has occurred, a second sensor value array is generated from a second set of inputs from one or more second sensors. The second sensor value array is fed as input to a second function generated by a second neural network. One or more second output values are calculated based on the second function, and the first state is exited based on these second output values.

23 Claims, 6 Drawing Sheets

ADJUSTING MOBILE DEVICE STATE BASED ON USER INTENTIONS AND/OR IDENTITY

TECHNICAL FIELD

This disclosure generally relates to mobile electronic devices.

BACKGROUND

A mobile electronic device, such as a smartphone, tablet, notebook computer, etc., may have multiple operation states. For example, while a mobile device is not being used by its user, it may be in a power-saving or sleep state (e.g., the screen is dim or dark) in order to decrease power-consumption level and prolong battery life. In some cases, the mobile device may also be in an input-locked state (e.g., the touch-screen or keypad of the mobile device is locked) so that the mobile device does not perform unintentional or accidental operations. In other cases, the mobile device may be security-locked, such that a user is required to provide a correct password or personal identification number (PIN) in order to unlock and use the device. On the other hand, while the mobile device is being actively used by its user, it may be in a normal operation state (e.g., at full power level and with the screen or keypad unlocked and ready to receive user input).

DESCRIPTION OF EXAMPLE EMBODIMENTS

Figure 1:
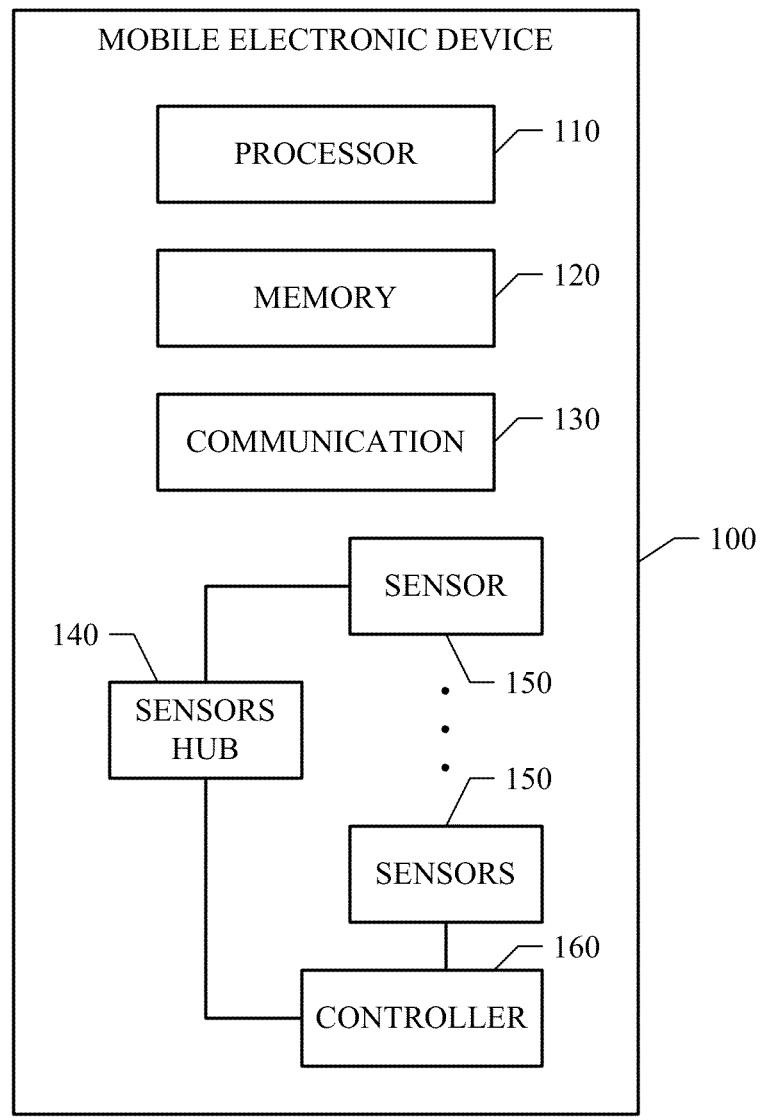
FIG. 1 illustrates an example mobile electronic device.

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A mobile electronic device, such as a smartphone, tablet or notebook, may have multiple operation states. For example, when a mobile device has not been used by its user for a period of time (e.g., a few seconds), it may enter into a power-saving state. At the power-saving state, the mobile device may operate at a lower power level in order to save energy and prolong battery life. The screen of the mobile device may be dim or dark. To bring the mobile device out of the power-saving state into the normal power state, the user may need to perform an action with the mobile device (e.g., pushing the power button of the mobile device). In some cases (e.g., after the mobile device is in the power-saving state for a few seconds), the mobile device may also enter into an input-lock state. At the input-lock state, the input component (e.g., keypad or touch-sensitive screen) of the mobile device may be locked to prevent accidental inputs causing unintentional operations. To unlock the keypad or screen of the mobile device, the user may need to perform another action with the mobile device. For example, if the mobile device has a keypad, the user may need to push a key. If the mobile device has a touch-sensitive screen, the user may need to press a control to power up the device and make a swipe gesture on the screen. In addition, the mobile device may have a security-lock state. At the security-lock state, the mobile device is password or PIN (Personal Identification Number) locked to prevent unauthorized access to and usage of the mobile device. To unlock the mobile device, the user may need to enter the appropriate password or PIN. When the mobile device is being actively used by its user, it may be in a normal operation state (e.g., operating at the full power level and ready to receive user inputs). In some cases, the mobile device may be in an operation state where its audio output is turned on, an operation state where its audio output is turned off, or an operation state where its audio output is in a specific mode (e.g., loud, quiet, vibrate, etc.). Other operation states may also be possible, and this disclosure contemplates any applicable operation state.

At any given time, a mobile device may be in any one of the operation states, depending on, for example, whether the user is currently using the mobile device, the amount of time that has passed since the user's last use of the mobile device, or the location of the mobile device (e.g., in a carrying case, in the user's pocket or purse, etc.).

For example, suppose that the user has not used his mobile device (e.g., an Apple iPhone) for some time and the mobile device has been stored in the user's pocket. In this case, the mobile device is most likely in the power-saving state to save battery as well as the input-lock state to prevent accidental inputs. In addition, the mobile device may also be in the security-lock state to prevent unauthorized access to the mobile device. Further suppose that the user now wishes to use his mobile device. The user may need to: (1) take the mobile device out of his pocket; (2) push the power button to bring the mobile device out of the power-saving state; and (3) swipe the touch screen to unlock the input component of the mobile device. In addition, if the mobile device is security locked as well, then the user also needs to enter the password or PIN to unlock the mobile device. At the least, the user needs to perform a few actions, which may take several seconds, before the mobile device is ready to be used. Considering that such a sequence of actions may need to be performed several times a day (e.g., each time the user needs to use his mobile device after not using the mobile device for a period of time), it may become an inconvenience.

Therefore, particular embodiments may automatically adjust the current state of a mobile electronic device based on the intention of a user with respect to the mobile electronic device. In particular embodiments, a mobile electronic device, such as a mobile device, may include various types of sensors, such as, for example and without limitation, touch sensors (disposed, for example, on a display of the device, the back of the device and/or one or more lateral edges of the device) for detecting a user touching the surface of the mobile electronic device (e.g., using one or more fingers), accelerometers for detecting whether the mobile electronic device is moving and the speed of the movement, thermometers for measuring the temperature change near the mobile electronic device, proximity sensors for detecting the proximity of the mobile electronic device to another object (e.g., a hand, desk, or other object), light sensors for measuring the ambient light around the mobile electronic device, imaging sensors (e.g., cameras) for capturing digital images of objects near the mobile electronic device, location sensors (e.g., Global Positioning System (GPS)) for determining the location (e.g., in terms of latitude and longitude) of the mobile electronic device, near field communication (NFC) sensors, Bluetooth sensors, etc. This disclosure contemplates that a mobile electronic device may include any applicable type of sensors. These sensors may provide various types of sensor data, which may be analyzed to determine the user's intention with respect to the mobile electronic device at a given time.

FIG. 1 illustrates an example mobile electronic device 100. In particular embodiments, mobile electronic device 100 may include processor 110, memory 120, communication component 130 (e.g., antenna and communication interface for wireless communications), and a number of sensors 150 of various types (e.g., touch sensor, accelerometer, thermometer, proximity sensor, light sensor, imaging sensor, etc.). In particular embodiments, a sensors hub 140 may optionally be included in mobile device 100. Sensors 150 may be connected to sensors hub 140, which may be a low power-consuming processor that controls sensors 150, manages power for sensors 150, processes sensor inputs, aggregates sensor data, and performs certain sensor functions. In addition, in particular embodiments, some types of sensors 150 may be connected to a controller 160. In this case, sensors hub 140 may be connected to controller 160, which in turn is connected to sensor 150. Alternatively, in particular embodiments, there may be a sensor monitor in place of sensors hub 140 for managing sensors 150.

Figure 2:
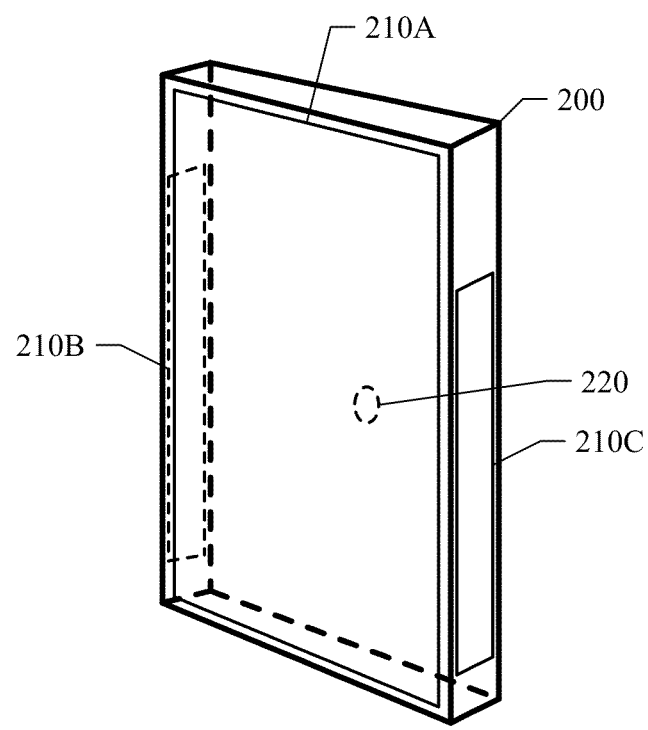
FIG. 2 illustrates the exterior of an example mobile device.

In particular embodiments, mobile electronic device 100 (e.g., a mobile device) may have a touchscreen as its input component. FIG. 2 illustrates the exterior of an example mobile device 200. Mobile device 200 has six sides: front, back, top, bottom, left, and right. Touch sensors may be placed anywhere on any of the six sides of mobile device 200. For example, in FIG. 2, a touchscreen incorporating touch sensors 210A is placed on the front of mobile device 200. The touchscreen may function as an input/output (IO) component for mobile device 200. In addition, touch sensors 210B and 210C are placed on the left and right sides of mobile device 200, respectively. Touch sensors 210B and 210C may detect a user's hand touching the sides of mobile device 200. In particular embodiments, touch sensors 210A, 210B, and 210C may be implemented using resistive, capacitive, and/or inductive touch sensors. The electrodes of the touch sensors 210A, 210B, and 210C may be arranged on a thin solid piece of material or a thin wire mesh. In the case of capacitive touch sensors, there may be two types of electrodes: transmitting electrodes and receiving electrodes. These electrodes may be connected to a controller (e.g., controller 160 illustrated in FIG. 1), which may be a microchip designed to drive the transmitting electrodes with electrical pulses and measure the changes in capacitance from the receiving electrodes caused by a user's touches in order to detect the locations of the user touches.

Mobile device 200 is one example of a mobile electronic device 100, and in practice, a device may have any number of sides. This disclosure contemplates devices with any number of sides. The touch sensors may be placed on any side of a device. Mobile devices may have a plurality of touch sensors 210A-C that are arranged in different positions for each device.

In particular embodiments, mobile device 200 may have a proximity sensor 220 (e.g., an infrared LED (light-emitting diode)) placed on its back side. Proximity sensor 220 may be able to supply sensor data for determining its proximity, and thus the proximity of mobile device 200, to another object.

In particular embodiments, in addition to the front side, the mobile device may have touch sensors on the left and right sides. Optionally, the mobile device may also have touch sensors on the back, top, or bottom side. Thus, as the user's hand touches the mobile device to grab hold of it, the touch sensors may detect the user's fingers or palm touching the mobile device. The touch-sensor data may be analyzed to determine when and where the user has touched the mobile device. When the user touches the mobile device, it may be an indication that the user may wish to use the mobile device. In particular embodiments, upon detecting that the user has touched the mobile device, the mobile device may be brought out of the power-saving state into normal operation state. The main CPU may be transitioned to a powered-up state, the screen of the mobile device may be turned on and lit up, and the input component (e.g., the keypad or touchscreen on the front side) of the mobile device may be unlocked automatically. As a result, by the time the user brings the mobile device out of his pocket for use, the mobile device is ready to receive user inputs and commence normal operations.

In particular embodiments, the placement of touch sensors on the left, right, top, and/or bottom sides may allow for sensing whether a user is touching both sides of the mobile device (i.e., the user is grasping the mobile device). Thus, the touch sensors can differentiate grasping the mobile device in addition to simply touching it. In particular embodiments, being able to detect that the user has grasped the mobile device may yield a more accurate, and thus better, indication of the user's intention. Using this intention, the mobile device may be brought out of the power-saving state into normal operation state. The main CPU may be transitioned to a powered-up state; the screen of the mobile device may be turned on and lit up; and the input component (e.g., the keypad or touchscreen on the front side) of the mobile device may be unlocked automatically. As a result, by the time the user brings the mobile device out of his pocket for use, the mobile device is ready to receive user inputs and commence normal operations. Nevertheless, as described above, it is possible to estimate the user's intention using a single touch.

In particular embodiments, the mobile device may have an accelerometer in addition to or instead of the touch sensors on the left and right sides. Sometimes, the user may put his hand in the pocket where the mobile device is stored and thus touch the mobile device even when the user does not intend to use the mobile device at that time. If the mobile device also has an accelerometer, the sensor data provided by the accelerometer may also be used to estimate whether the user intends to use the mobile device. When the mobile device is stored in the user's pocket, it may move as the user moves. However, such movements usually are relatively slow. On the other hand, when the user grabs hold of the mobile device and takes it out of the pocket for use, there may be a relatively sudden increase in the movement speed of the mobile device. This change in the mobile device's movement speed may be detected based on the sensor data supplied by the accelerometer. In particular embodiments, upon detecting that there is a significant increase in the speed of the mobile device's movement, either by itself or in addition to detecting that the user has touched the mobile device, the mobile device may be brought out of the power-saving state into normal operation state (e.g., turn on the screen of the mobile device) and the input component of the mobile device may be unlocked automatically.

In particular embodiments, the mobile device may have a gyrometer in addition or instead of the touch sensors (e.g., touch sensors on the left and right sides of the mobile device). A gyrometer, also known as a gyroscope, is a device for measuring orientation along one or more spatial dimension. In particular embodiments, a gyrometer may be used to measure the orientation of the mobile device. When the mobile device is stored in the user's pocket, it may stay mostly in one orientation. However, when the user grabs hold of the mobile device and takes it out of the pocket for use, there may be a relatively sudden change in the orientation of the mobile device. The orientation of the mobile device may be detected and measured by the gyrometer. If the orientation of the mobile device has changed significantly, it may be another indication that the user may have taken the device out of his pocket.

In particular embodiments, the mobile device may have a light sensor. When the mobile device is stored in the user's pocket, it is relatively dark around the mobile device. On the other hand, when the user brings the mobile device out of his pocket, it may be relatively bright around the mobile device, especially during day time or in well-lit areas. The sensor data supplied by the light sensor may be analyzed to detect when a significant change in the ambient light level around the mobile device occurs. In particular embodiments, upon detecting that there is a significant increase in the ambient light level around the mobile device, either by itself or in addition to detecting other characteristics, including (but not limited to) detecting that the user has touched the mobile device or detecting that there is a significant increase in the speed of the mobile device's movement, the mobile device may be brought out of the power-saving state into normal operation state and the input component of the mobile device may be unlocked automatically.

In particular embodiments, the mobile device may have a proximity sensor. The sensor data supplied by the proximity sensor may be analyzed to detect when the mobile device is in close proximity to an object, such as the user's hand. For example, as illustrated in FIG. 2, mobile device 200 may have an infrared LED 220 (i.e., proximity sensor) placed on its back side. When the user holds such a mobile device in his hand, the palm of the user's hand may cover infrared LED 220. As a result, infrared LED 220 may detect when the user's hand is in close proximity to mobile device 200. In particular embodiments, upon detecting that the mobile device is in close proximity to the user's hand, either by itself or in combination with other types of sensor indications described herein, the mobile device may be brought out of the power-saving state into the normal operation state and the input component of the mobile device may be unlocked automatically.

A mobile device may have any number of sensors of various types, and these sensors may supply different types of sensor data. Different combinations of the individual types of sensor data may be used together to detect and estimate a user's intention with respect to the mobile device (e.g., whether the user intends to take the mobile device out of his pocket and use it). Using multiple types of sensor data in combination may yield a more accurate, and thus better, estimation of the user's intention with respect to the mobile device at a given time than only using a single type of sensor data. Nevertheless, it is possible and often desirable to estimate the user's intention using a single type of sensor data (e.g., touch-sensor data). Additionally, because every user may grip his or her mobile device differently, sensor inputs for grabbing actions may not be consistent across users and devices. Detecting a pattern across all users and devices for particular sensor values when a user grabs a mobile device may take thousands of man-hours, and as such, this task may be well-suited to be performed by, in particular embodiments, an artificial neural network.

Figure 3:
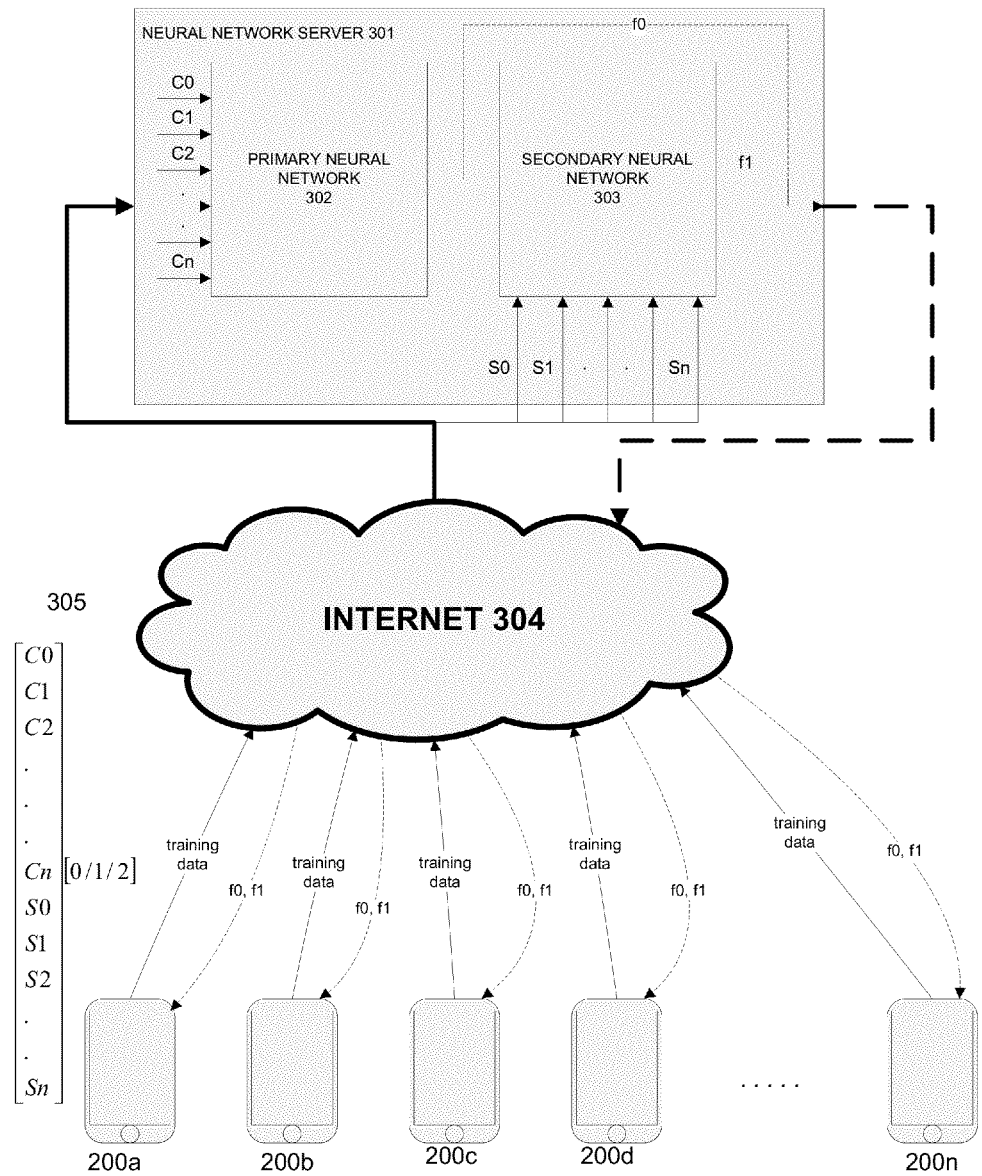
FIG. 3 illustrates an example network environment for receiving training data from one or more mobile devices.

FIG. 3 illustrates an example network environment for a particular embodiment utilizing training data from client mobile devices. FIG. 3 depicts multiple mobile devices 200a-200n. Mobile devices 200a-n may be of any type as described above. In particular embodiments, mobile devices 200a-n are of a particular class of mobile device, such as a smartphone. In particular embodiments, mobile devices 200a-n may be of a particular type or model of smartphone. However, in particular embodiments, each of mobile devices 200a-n may be of any manufacturer or model.

Each of mobile device 200a-n may include, in particular embodiments, an application program for recording and transmitting training data 305 to a centralized neural network server 301. The training data 305 collected by mobile devices 200a-n may be used to train a primary neural network 302 and a secondary neural network 303. In particular embodiments, any suitable number of neural networks may be utilized. In particular embodiments, only one neural network may be used. This disclosure contemplates any number of neural networks generating any number of outputs or functions.

The application program resident on each of mobile devices 200a-n may, during the training phase, prompt the user to perform specific motions within a predetermined period of time. For example, the application may prompt the user: "Please place your phone on a flat surface and pick it up for use as you normally would in the next 15 seconds." When the user complies, the training application may record sensor data from the various sensors 150 for the particular action, and may transmit the sensor values as an array of values and a state value. For example, training data 305 depicts a one-dimensional array with capacitances C0-Cn and sensor values S0-Sn. In particular embodiments, capacitances C0-Cn are generated by touch sensors 210A-C. In particular embodiments, touch sensors 210A-C may be resistive, and training data 305 includes the impedance measured by touch sensors 210A-C. Training data 305 also includes a state. For example, the training application may assign a "0" to a first state representing grabbing a phone from a table and raising it for use. As another example, the training application may assign a "1" to a second state representing grabbing a phone from a pocket for use, and the training application may assign a "2" for a third state representing a phone in a pocket or purse. In particular embodiments, the training application may have any number of states representing any suitable action or movement. This disclosure contemplates any number of possible states.

The training applications on mobile devices 200a-n transmit training data via Internet 304 to neural network server 301. Neural network server 301 maintains one or more neural networks; in this example, primary neural network 302 and secondary neural network 303. Neural networks 302 and 303 may receive training data from a plurality of mobile devices 200a-n, and use machine learning algorithms to recognize patterns of sensor values correlated with one or more states. In particular embodiments, neural networks 302 and 303 may be recurrent neural networks. In particular embodiments, the neural networks may be feedforward neural networks. In particular embodiments, backpropagation through time (BPTT) training is utilized. In particular embodiments, backpropagation training is utilized. This disclosure contemplates the use of any suitable neural network, and any suitable method of training neural networks 302 and 303.

Primary neural network 302 and secondary neural network 303 may utilize only a portion of sensor values included in training data 305. For example, in particular embodiments, primary neural network 302 receives only capacitance values from touch sensors 210A-C of one or more of the plurality of mobile devices 200a-n as inputs. In particular embodiments, primary neural network 302 may only receive sensor values from sensors that are always running, or from low-power sensors. In particular embodiments, secondary neural network 303 may receive inputs from a different or overlapping set of sensors than that of primary neural network 302. For example, secondary neural network 303 may receive sensor values from an accelerometer, gyrometer, light sensor, proximity sensor, or another sensor of one or more of the plurality of mobile devices 200a-n that is not activated during a sleep or locked mode.

Primary neural network 302 outputs a function f0 that may be executed on or convolved with a set of sensor values C0-Cn. Function f0 may, in particular embodiments, be limited to the processing capabilities of a low-power microcontroller in mobile device 200, such as controller 160. In particular embodiments, function f0 may be a series of logical operators, such as left shifts, or right shifts, that may save memory or processor resources. Any suitable methods of implementing mathematical operations may be used. Similarly, secondary neural network 303 outputs a function f1 that may be executed on or convolved with a set of sensor values S0-Sn. Function f1 may, in particular embodiments, be significantly more computationally complex than function f0, requiring a higher-capability floating-point unit or other processing elements. In particular embodiments, function f1 may only be executed by main processor 110 of mobile device 200. After calculation, neural network server 301 may transmit functions f0 and f1 to mobile devices 200a-n through Internet 304.

In particular embodiments, neural networks 302 and 303 calculate functions f0 and f1, respectively, at predetermined intervals. In particular embodiments, the interval may be one week. In particular embodiments, neural networks 302 and 302 calculate functions f0 and f1 when the amount of training data 305 exceeds a predetermined number of samples. In particular embodiments, neural networks 302 and 303 calculate functions f0 and f1 continuously, and transmit updates to users of mobile devices 200a-n only if the function f0 or f1, respectively, varies by a predetermined amount from the most-recently transmitted function value. This disclosure contemplates any suitable interval for calculating and transmitting functions f0 or f1 to mobile devices 200a-n.

The functions f0 and f1 generated by neural networks 302 and 303 improve in accuracy with the number of sets of training data 305 received. In particular embodiments, neural network server 301 and the training application may obtain training data from users of an application or service, such as a social networking system. In particular embodiments, neural network server 301 may be hosted by a social networking system having a social networking application resident on mobile devices 200a-n.

Figure 4:
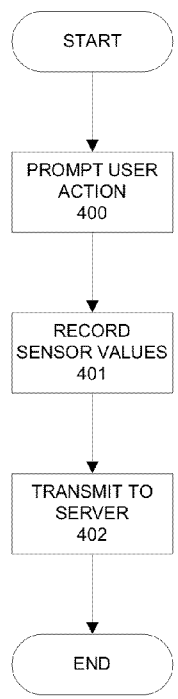
FIG. 4 illustrates an example method of obtaining and transmitting training data.

FIG. 4 illustrates an example method for collecting training data according to a particular embodiment. At Step 400, the trainer application prompts the user to perform an action represented by one or more states within a predetermined amount of time. As previously discussed, this action may include removing a phone from a pocket, grabbing a phone from a flat surface, or leaving a phone in a pocket or purse. In particular embodiments, training application may have any number of states, including transition states. For example, training application may ask the user to place mobile device 200 into a pocket as a first state, and remove the mobile device 200 from the pocket to collect data representing a second state. In particular embodiments, the prompts may be visual or audible. For example, after placing mobile device 200 into his or her pocket, the user may be prompted audibly to walk a certain number of steps so that the sensors of mobile device 200 may record examples of data generated by "noise", that is, movement while not in use in a pocket or bag, for example. This disclosure contemplates any suitable number of states, and any suitable means of prompting users to perform actions represented by those states.

At Step 401, the training application records sensor values during the duration of the predetermined time period. In particular embodiments, mobile device 200 records from every available sensor. In particular embodiments, mobile device 200 only records from a subset of available sensors. This disclosure contemplates any suitable method of capturing sensor data from the plurality of sensors of mobile device 200. In particular embodiments, the training application takes into account the position of each touch sensor 120A-C for different models of mobile devices 200a-n. For example, mobile device 200a may have touch sensors in different locations from mobile device 200b. The training application may, in particular embodiments, request that the user enter the make and model of his or her particular mobile device, so that each of the sensor outputs may be mapped to the correct input of neural networks 302 and 303. In particular embodiments, the training application may read the mobile device make and model from the mobile device itself; for example, from the firmware or BIOS of the mobile device.

At Step 402, the training application in each mobile device 200a-200n transmits the sensor values and a state to neural network server 301. In particular embodiments, the process of Steps 400 and 401 is repeated for each state, and all the training data from each action represented by a particular state is aggregated and transmitted at once. In particular embodiments, the process repeats steps 400-402 for each state, and training data 305 is transmitted to neural network server 301 as soon as it is captured. In particular embodiments, not every mobile device 200a-n will participate in training. For example, mobile device 200n may receive functions f0 and f1 without providing training data 305 to neural network server 301. As more devices submit training data 305, the more accurate and robust functions f0 and f1 become. In particular embodiments, training may be required of mobile devices 200a-n. In particular embodiments, different devices may be required to periodically perform the training of FIG. 4. This disclosure contemplates any suitable method of collecting training data 305.

Figure 5:
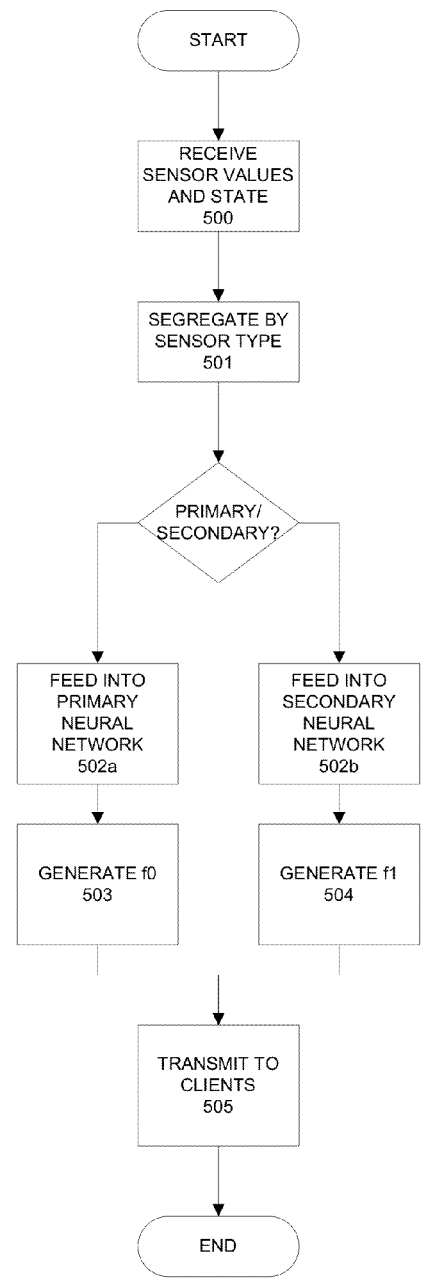
FIG. 5 illustrates an example method of generating functions via neural networks.

FIG. 5 illustrates an example method performed by neural network server 301 to generate functions f0 and f1. At Step 500, neural network server 301 receives training data 305 from various mobile devices 200a-n. In particular embodiments, neural network server 301 may generate functions f0 and f1 when the number of sets of training data 305 received exceeds a predetermined threshold. In particular embodiments, neural network server 301 may generate functions f0 and f1 continuously, but only transmit the generated functions to mobile devices 200a-n periodically. This disclosure contemplates any suitable timing of function generation, updating, and transmission.

At Step 501, neural network server 301 segregates the sensor values based on sensor type. In particular embodiments, primary neural network 302 and secondary neural network 303 may utilize different sensors as inputs. For example, primary neural network 302 may only accept sensor values from capacitive touch sensors 120A-C as inputs. Thus, capacitance values C0-Cn, and a state indicator, may be fed into primary neural network 302. In contrast, secondary neural network 302 may only accept sensor values from a gyrometer, accelerometer, light sensors, or the like. Thus, sensor values S0-Sn and a state indicator may be fed into secondary neural network 303. In particular embodiments, there may be substantial overlap between the sensor inputs accepted by each neural network. For example, secondary neural network 303 may accept both sensor values from one or more touch sensors 120A-C as well as other high-power sensors such as cameras, light sensors, proximity sensors, or the like. This disclosure contemplates any combination of inputs to neural networks 302 and 303.

At Steps 502a and 502b, specific sensor values are transmitted to neural networks 302 and 303. In particular embodiments, the specific sensor values are transmitted along with the state value included in training data 305. Thus, primary neural network 302 may receive capacitances C0-Cn from touch sensors 120A-C along with the state of the device during the sensor inputs; for example, that the device was being grabbed, that the device was flat on a table, or that the device was in a bag or pocket. Similarly, secondary neural network 303 may receive sensor values S0-Sn (and, in particular embodiments, C0-Cn) along with a state value.

At Steps 503 and 504, neural networks 302 and 303 generate functions f0 and f1, respectively. Neural networks 302 and 303 may be of any type of neural network. In particular embodiments, neural networks 302 and 303 may be recurrent neural networks. In particular embodiments, neural networks 302 and 303 may be Hopfield, Elman, Jordan, Echo state, long short-term memory, bi-directional, or continuous time recurrent neural networks. In particular embodiments, neural networks 302 and 303 may be feed forward neural networks. In particular embodiments, neural networks 302 and 303 may utilize adaptive linear elements (ADALINE) and multiple adaptive linear elements (MADALINE). This disclosure contemplates any suitable neural networks 302 and 303 for generating functions f0 and f1. In particular embodiments, neural network 302 may be of a different type, training method, or architecture from neural network 303. In particular embodiments, the computational complexity of neural networks 302 and 303 is limited by the processor on which the function f0 or f1 will be run. For example, f0 may be designed to be computationally simple for execution on a low-power microcontroller. By contrast, function f1 may be designed to be more computationally complex or processor-intensive for execution by a higher-power main processor unit such as processor 110.

At Step 505, neural network server 301 transmits functions f0 and f1 to client devices 200a-200n. As previously discussed, neural network server 301 may transmit functions f0 and f1 to any mobile device 200. In particular embodiments, mobile devices 200 are not required to have participated in neural network training by transmitting training data 305 to neural network server 301. In particular embodiments, neural network server 301 may transmit functions f0 and f1 at predetermined intervals. As previously described, function f0 or f1 may be transmitted when it differs a predetermined amount from the previously transmitted function. This disclosure contemplates any suitable transmission method or timing.

Figure 6:
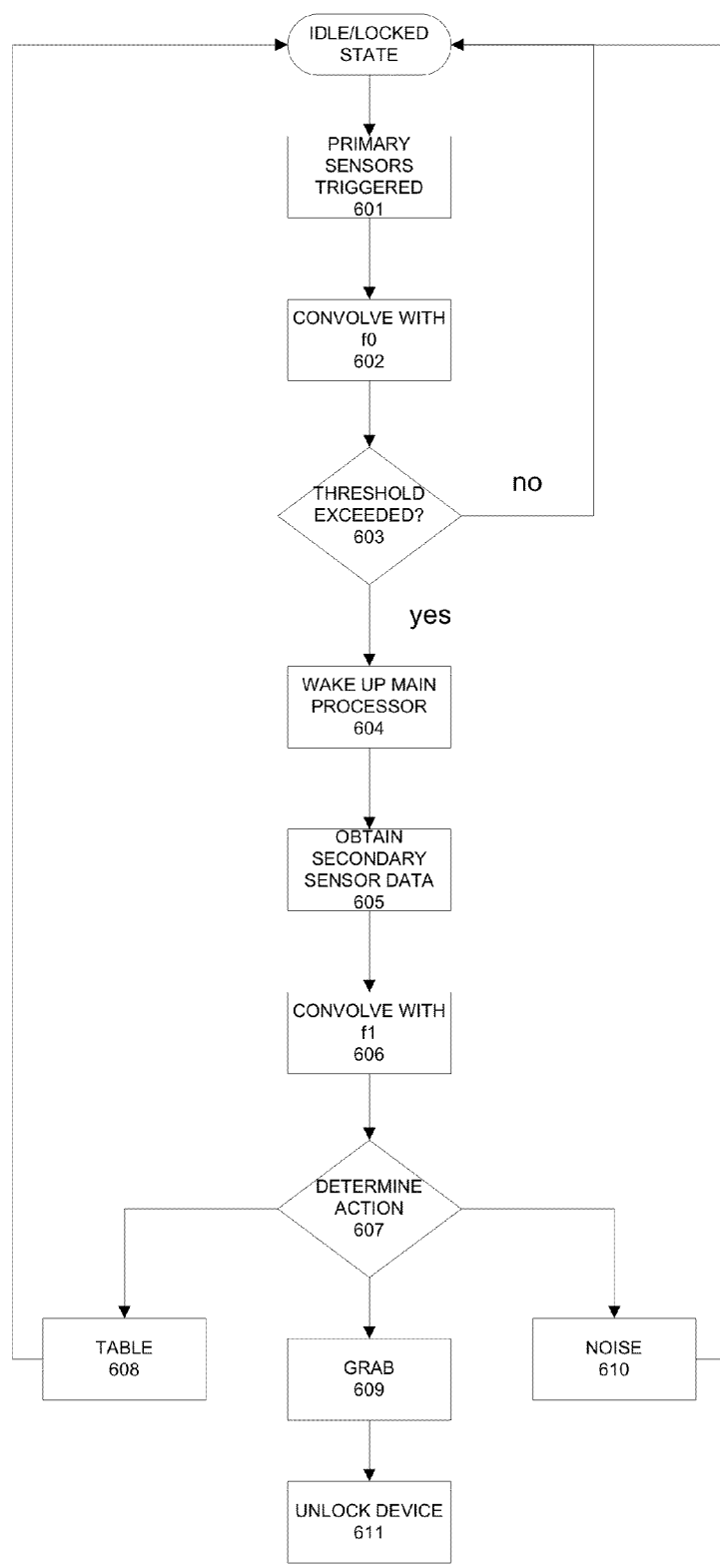
FIG. 6 illustrates an example method of detecting a physical state of a mobile device via mobile device sensors.

FIG. 6 illustrates an example method executed by a mobile device 200a-n for using sensor data to selectively exit a locked state. When the process begins, mobile device 200 is idle or locked; for example, after a user has manually locked the device, or after a long period of inactivity.

At Step 601, microcontroller or sensor controller 160 detects inputs of its primary sensors. In particular embodiments, the primary sensors are the sensors utilized by function f0, generated by primary neural network 302. In particular embodiments, the primary sensors are touch sensors 120A-C, and are continuously monitored by microcontroller or sensor controller 160, even in the idle state.

At Step 602, microcontroller or sensor controller 160 executes function f0 with the values generated by the primary sensors as input values. In particular embodiments, the sensor values of primary sensors may be arranged in a data structure, such as an array, in a particular order. For example, function f0 may call for the inputs to be arranged in the order: left capacitive touch sensor, back capacitive touch sensor, right capacitive touch sensor. In particular embodiments, sensor values may be expressed as a vector. In particular embodiments, function f0 may be a set of weights to be multiplied by each of the values in the input vector. In particular embodiments, function f0 may simply be convolved with the input vector of sensor values. In such embodiments, in order to preserve computational efficiency, the convolution operation may be executed as a series of bit-shifts and logical operations between f0 and the input vector, allowing function f0 to be executed in a low-level language such as assembly.

Function f0 outputs, as a result of convolution with the input vector, one or more values. In particular embodiments, there may be only a single output value. In particular embodiments, there may be an output value for each of the possible output states, such as "grab", "table", or "noise" (indicating, for example, that the device is in a pocket or bag). In particular embodiments, the one or more output values may be discrete. In particular embodiments, the one or more output values may be continuous, representing the probability that mobile device 200 is in the one or more states. This disclosure contemplates any suitable output values from function f0.

At Step 603, mobile device 200 assess the output of function f0 to determine whether to wake main processor 110 and proceed to function f1. Such a determination corresponds to a determination that the output values of f0 indicate that a grab action is likely. In particular embodiments, this determination may be based upon the average of all output values. In particular embodiments, this determination may be based on whether a single output value, for example, the value corresponding to the "grab" action, exceeds a particular threshold. In particular embodiments, this determination may be based on whether a particular output value, such as the value associated with the "noise" state, is below a predetermined threshold. This disclosure contemplates any suitable decision algorithm based on the output from function f0.

At Step 604, upon a positive determination that a grab action is likely in Step 603, microcontroller or sensor processor 160 may transmit a notification message to wake up main processor 110 of mobile device 200. In particular embodiments, the notification message may be a hardware interrupt to wake up main processor 110. In particular embodiments, microcontroller or sensor processor 160 may have a hardwired circuit specifically designed to wake up main processor 110. This disclosure contemplates any suitable means of waking up main processor 110.

At Step 605, mobile device 200 obtains sensor data from secondary sensors used by function f1. In particular embodiments, the secondary sensors may include the accelerometer. For example, secondary neural network 303 may have generated function f1 to recognize particular accelerometer patterns that indicate mobile device 200 has been taken out of a pocket, or lifted from a table. Thus after the initial awakening by the microcontroller, main processor 110 may pull sensor values from the accelerometer. In particular embodiments, the secondary sensors may include the gyrometer. For example, secondary neural network 303 may have generated function f1 to recognize particular gyrometer sensor value patterns that indicate rotation about one or more axes that signal that mobile device 200 has been taken out of a pocket, or lifted from a table. In particular embodiments, the secondary sensors may include a light sensor. In particular daytime environments, transitions from dark to light may signal that mobile device 200 has been pulled from a pocket. In particular embodiments, the secondary sensors may comprise any combination of sensor values. In particular embodiments, the secondary sensors may comprise values from the camera subsystem of mobile device 200. In particular embodiments, the secondary sensors may include the system clock; for example, function f1 may adjust the probability that a given set of inputs corresponds to a grab depending on the time of day. This disclosure contemplates obtaining data from any number or combination of sensors in Step 605.

At Step 606, mobile device 200, via main processor 110, executes function f1 using the secondary sensor values obtained in Step 605 as inputs. As previously discussed, the secondary sensor values may be arranged in an array or vector data structure. In particular embodiments, the sensor data S0-Sn may be arranged in a data structure in a particular order. In particular embodiments, function f1 may be executed by convolving an input vector with the function weights. This disclosure contemplates any suitable method of executing function f1 using values obtained from the secondary sensors as inputs.

At Step 607, main processor 110 determines the physical state of mobile device 200 (or the user's intention) from the output of function f1. As previously discussed, function f1 may output one or more values, each corresponding to a particular physical state of mobile device 200. For example, function f1 may output values signaling that the device may be grabbed, laying flat on a table, or in a pocket ("noise"). In particular embodiments, each value may be discrete or continuous. In particular embodiments, the determination may be based on the sum, average, weighted average, or another mathematical combination of the values being above or below a predetermined threshold. At Steps 608 and 610, if mobile device 200 is in the "table" or "noise" states, mobile device returns to the idle/locked state and powers down main processor 110. If, however, mobile device 200 determines that the user intends to use it, mobile device 200 may automatically transition to the unlocked state at Step 611.

In particular embodiments, the identity of the user currently handling the mobile device may be verified. If the user currently handling the mobile device is the true owner of the mobile device, the mobile device may be unlocked automatically. On the other hand, if the identity of the user currently handling the mobile device cannot be verified satisfactorily, the user may be prompted and required to provide a password or PIN in order to unlock and use the mobile device.

There may be various means to verify a user's identity. In particular embodiments, the mobile device may have an imaging sensor (e.g., a camera). As the user brings the mobile device in front of his face, the camera may analyze captured digital images of the objects in front of its lens in order to capture the user's face. These images may be analyzed using one or more suitable facial recognition algorithms to locate and compare the user's face to the face of the owner of the mobile device (e.g., the face stored on file in connection with the mobile device). If there is a sufficient amount of similarity between the two faces (i.e., a match), then the user currently handling the mobile device may be verified as the actual owner of the mobile device, and the mobile device may be unlocked without asking the user to explicitly provide a password or PIN. The image representing the face of the owner of the mobile device may be stored on the mobile device itself or elsewhere (e.g., on a server accessible to the mobile device).

In particular embodiments, the user of the mobile device may be a member of a social-networking system. A social network, in general, is a social structure made up of entities, such as individuals or organizations, that are connected by one or more types of interdependency or relationships, such as friendship, kinship, common interest, financial exchange, or relationships of beliefs or knowledge. In more recent yeas, social networks have benefited from the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc.

The user may have a profile with the social-networking system that includes information relevant to the user (e.g., demographic data, social connections and activities, interests, hobbies, etc.). In particular embodiments, the information found in the user's profile may also be used to help determine the user's intention with respect to the mobile device at a given time or estimate the user's identity. For example, if, based on the user's calendar stored with the social-networking system, it is determined that the user is attending an event (e.g., a meeting), then the mobile device may be transitioned to a state where the screen is turned off and the input component is locked. As another example, it may be determined, based on the information available with the social-networking system, that the user is with his social connections (e.g., friends) at a given time and location. If the mobile device is in an atypical location for its owner, but at the same time, several of the owner's family members or friends are also there, this may suggest that the mobile device is with its true owner, in which case, the device may be unlocked without requiring a password or PIN. On the other hand, if the mobile device is in an atypical location and none of its owner's social connections is there, a password or PIN may be required to unlock the device to ensure that the user of the device is indeed its true owner.

In particular embodiments, the true owner of the mobile device may be able to specify settings and indicate conditions for unlocking the device without requiring a password or PIN. For example, the owner may specify that when a number of his social connections (e.g., friends or family members) are detected near the device (e.g., using any suitable means, such as NFC, voice or face recognition, etc.), the phone may be unlocked without requiring a password or PIN or have a lower threshold for security, and vice versa.

In particular embodiments, the user's status updates with the social-networking system may be used as a signal to help authenticate the user. For example, the user's status updates may indicate that the user is actually in a specific location, may be used to detect that the user's friends are nearby, or the user is tagged by a friend in a check-in, which in turn indicates that the user is at a specific location.

In particular embodiments, the sensors included in the mobile device may be used to navigate within the social-networking system, including third-party applications (e.g., online games) provided through the social-networking system.

Figure 7:
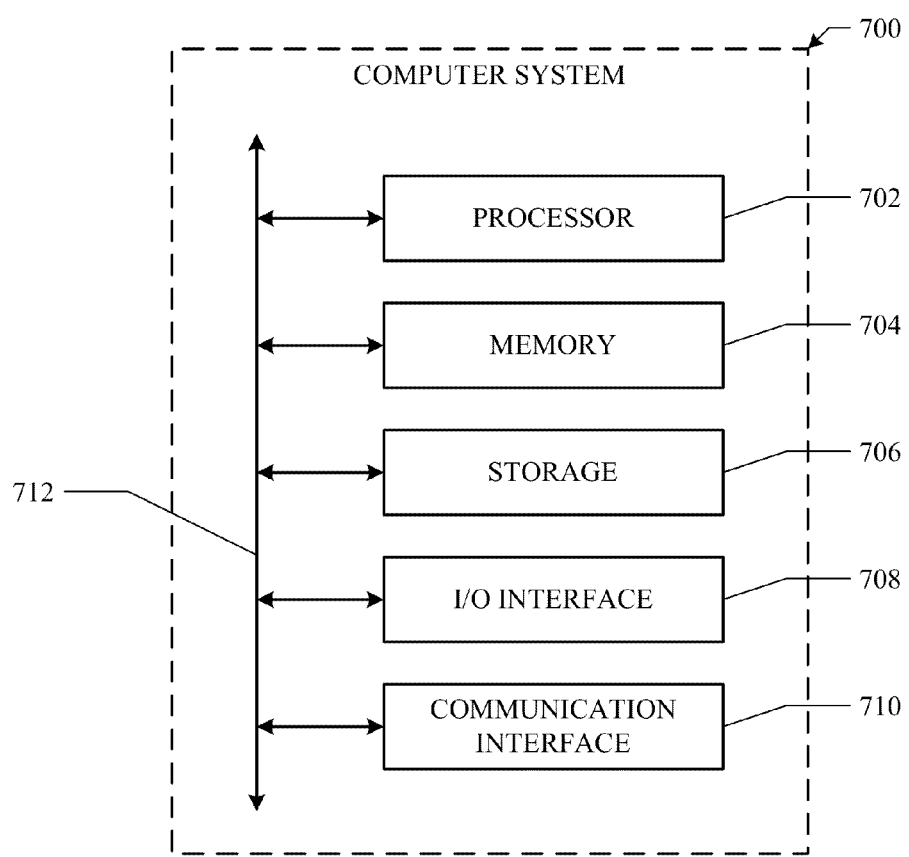
FIG. 7 illustrates an example computer system.

Particular embodiments may be implemented on one or more computer systems. FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile device, a personal digital assistant (PDA), a server, a tool, a toy, a wearable item, or a combination of two or more of these. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include an HDD, a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a mobile device network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 37 U.S.C. §101. Herein, reference to a computer-readable storage medium excludes transitory forms of signal transmission (such as a propagating electrical or electromagnetic signal per se) to the extent that they are not eligible for patent protection under 37 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 702 (such as, for example, one or more internal registers or caches), one or more portions of memory 704, one or more portions of storage 706, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing systems:
   detecting, while the one or more computing systems is in a first state, a first set of inputs from a plurality of first sensors;
   generating a first sensor value array, each of the sensor values in the first sensor value array corresponding to one of the first set of inputs;
   feeding the first sensor value array as input to a first function generated by a first neural network;
   calculating one or more first output values based at least in part on the first function;
   determining, based at least in part on the one or more first output values, if a first action has occurred; and
   in response to a determination that the first action has occurred:
      polling one or more second sensors for a second set of sensor inputs;
      generating a second sensor value array including a second set of sensor values, each of the second set of sensor values corresponding to one of the second set of sensor inputs;
      feeding the second sensor value array as input to a second function generated by a second neural network;
      calculating one or more second output values based at least in part on the second function; and
      based at least in part on the one or more second output values returned by the second function, exiting the first state.

2. The method of claim 1, wherein the one or more first output values are calculated by a low-power microcontroller; and in response to a determination that the first action has occurred, the micro-controller wakes up a processor from a sleep mode for calculation of the one or more second output values.

3. The method of claim 1, wherein the first sensors comprise touch sensors.

4. The method of claim 3, wherein the touch sensors are capacitive.

5. The method of claim 1, wherein the one or more second sensors comprise:
   an accelerometer;
   a light sensor; or
   a multi-touch display surface.

6. The method of claim 1, wherein the first state is a locked state.

7. The method of claim 1, wherein the first action is a grab action.

8. The method of claim 1, wherein the first and second functions are received from a server.

9. One or more computer-readable non-transitory storage media in one or more computing systems, the media embodying logic that is operable when executed to:
   detect, while the one or more computing systems is in a first state, a first set of inputs from a plurality of first sensors;
   generate a first sensor value array, each of the sensor values in the first sensor value array corresponding to one of the first set of inputs;
   feed the first sensor value array as input to a first function generated by a first neural network;
   calculate one or more first output values based at least in part on the first function;
   determine, based at least in part on the one or more first output values, if a first action has occurred; and
   in response to a determination that the first action has occurred:
      poll one or more second sensors for a second set of sensor inputs;
      generate a second sensor value array including a second set of sensor values, each of the second set of sensor values corresponding to one of the second set of sensor inputs;
      feed the second sensor value array as input to a second function generated by a second neural network;
      calculate one or more second output values based at least in part on the second function; and
      based at least in part on the one or more second output values returned by the second function, exit the first state.

10. The media of claim 9, wherein the one or more first output values are calculated by a low-power microcontroller; and in response to a determination that the first action has occurred, the micro-controller wakes up a processor from a sleep mode for calculation of the one or more second output values.

11. The media of claim 9, wherein the first sensors comprise capacitive touch sensors.

12. The media of claim 9, wherein the one or more second sensors comprise:
   an accelerometer;
   a light sensor; or
   a multi-touch display surface.

13. The media of claim 9, wherein the first state is a locked state.

14. The media of claim 9, wherein the first action is a grab action.

15. The media of claim 9, wherein the first and second functions are received from a server.

16. A device comprising:
   a processor;
   a plurality of first sensors;
   one or more second sensors; and a memory coupled to the processor comprising instructions executable by the processor, the processor being operable when executing the instructions to:
  detect, while the device is in a first state, a first set of inputs from the plurality of first sensors;
  generate a first sensor value array, each of the sensor values in the first sensor value array corresponding to one of the first set of inputs;
  feed the first sensor value array as input to a first function generated by a first neural network;
  calculate one or more first output values based at least in part on the first function;
  determine, based at least in part on the one or more first output values, if a first action has occurred; and
  in response to a determination that the first action has occurred:
  poll one or more of the second sensors for a second set of sensor inputs;
  generate a second sensor value array including a second set of sensor values, each of the second set of sensor values corresponding to one of the second set of sensor inputs;
  feed the second sensor value array as input to a second function generated by a second neural network;
  calculate one or more second output values based at least in part on the second function; and
  based at least in part on the one or more second output values returned by the second function, exit the first state.

17. The device of claim 16, wherein the device further comprises a low-power microcontroller, and wherein one or more first output values are calculated by the low-power microcontroller, and in response to a determination that a first action has occurred, the micro-controller wakes up the processor from a sleep mode for calculation of the one or more second output values.

18. The device of claim 16, wherein the plurality of first sensors comprise touch sensors.

19. The device of claim 18, wherein the touch sensors are capacitive.

20. The device of claim 16, wherein one or more of the second sensors comprise:
  an accelerometer;
  a light sensor; or
  a multi-touch display surface.

21. The device of claim 16, wherein the first state is a locked state.

22. The device of claim 16, wherein the first action is a grab action.

23. The device of claim 16, wherein the first and second functions are received from a server.

* * * * *